US006850894B2

United States Patent
Koda et al.

(10) Patent No.: US 6,850,894 B2
(45) Date of Patent: Feb. 1, 2005

(54) ELECTRONIC SHOPPING SYSTEM

(75) Inventors: Tsuyoshi Koda, Torrance, CA (US); Glenn O. Ihrke, Long Beach, CA (US); Stephen Mark Witt, Huntington Beach, CA (US); Shigeo Maeda, San Pedro, CA (US)

(73) Assignee: Alpine Electronics, Inc., Tokyo (JP)

( * ) Notice: Subject to any disclaimer, the term of this patent is extended or adjusted under 35 U.S.C. 154(b) by 943 days.

(21) Appl. No.: 09/747,102

(22) Filed: Dec. 21, 2000

(65) Prior Publication Data

US 2002/0082934 A1 Jun. 27, 2002

(51) Int. Cl.[7] .............................................. G06F 17/60
(52) U.S. Cl. ........................................... 705/9; 705/26
(58) Field of Search ......................... 705/8, 9, 26, 27; 700/100, 101, 102; 235/383

(56) References Cited

U.S. PATENT DOCUMENTS

| 5,169,097 | A | * | 12/1992 | Yasukawa | 248/27.1 |
| 5,434,394 | A | * | 7/1995 | Roach et al. | 235/375 |
| 5,732,400 | A | | 3/1998 | Mandler et al. | 705/26 |
| 5,920,846 | A | * | 7/1999 | Storch et al. | 705/7 |
| 6,058,373 | A | | 5/2000 | Blinn et al. | 705/26 |

FOREIGN PATENT DOCUMENTS

JP          8-156709       *   6/1996

OTHER PUBLICATIONS

"Pioneer Unveils Broad Car CD Line Aimed At Masses", Audio Week, v2, n12, Mar. 1990.*

* cited by examiner

Primary Examiner—F. J. Bartuska
(74) Attorney, Agent, or Firm—Brinks Hofer Gilson & Lione

(57) ABSTRACT

An electronic shopping system for selling vehicle devices stores, in a database, installation kit information indicating an installation kit required to install a vehicle device, for each combination of the vehicle device and a vehicle type and also stores information about installation dealers which are to install sold vehicle devices. On the basis of the location of a consumer input via a consumer terminal device, possible installation dates/times given by the consumer, and the dealer information stored in the database, a web server determines the installation dealer and the installation date/time and sends information about the determined installation dealer and installation date/time to the consumer terminal device. Furthermore, the web server searches the database for installation kit information indicating the installation kit required to install the sold vehicle device on the vehicle of the consumer, and the web server makes an arrangement for delivery of the vehicle device and the installation kit to the installation dealer.

21 Claims, 9 Drawing Sheets

FIG. 2

PRODUCTS LIST

| CATEGORY | MODEL | PRICE | POINTER |
|---|---|---|---|
| CD CHANGER | CDM-7857 | $ | ADc |
| | ⋮ | ⋮ | ⋮ |
| HEAD UNIT | | | |
| SPEAKER | DDS-17K | $ | ADs |
| | | | |
| | | | |
| NAVIGATION UNIT | | | |
| | | | |

ADc → FRONT IMAGE DATA OF CMD-7857
PRODUCT PERFORMANCE DATA
⋮
ADs → FRONT IMAGE DATA OF DDS-R17K (SPEAKER)
PRODUCT PERFORMANCE DATA
⋮

FIG. 3

INSTALLATION MATRIX

| PRODUCTS | VEHICLE TYPE | INSTALLATION GRADE | TIME | COST | POINTER |
|---|---|---|---|---|---|
| CDM-7857 | CAMRY 2000 | STANDARD | 30~40 MINUTES | $50 | $P_{11}$ |
| | ACCORD 2000 | STANDARD | 30~40 MINUTES | $50 | $P_{12}$ |
| | ⋮ | ⋮ | ⋮ | ⋮ | ⋮ |
| CDM-7857 DDS-R17K (SPEAKER) | CAMRY 2000 | UP-GRADE 1 | 60~70 MINUTES | $100 | $P_{21}$ |
| | ACCORD 2000 | UP-GRADE 1 | 60~70 MINUTES | $100 | $P_{22}$ |
| | ⋮ | ⋮ | ⋮ | ⋮ | ⋮ |
| CDM-7857 DDS-R17K (SPEAKER) | CAMRY 2000 | UP-GRADE 2 | 1.5~2.0 HOURS | $200 | $P_{31}$ |
| | ACCORD 2000 | UP-GRADE 2 | 2.0~2.5 HOURS | $300 | $P_{32}$ |
| | ⋮ | ⋮ | ⋮ | ⋮ | ⋮ |
| CDM-7857 DDS-R17K (SPEAKER) | CAMRY 2000 | SPECIAL | NOT DEFINED | NOT DEFINED | $P_{41}$ |
| | ACCORD 2000 | SPECIAL | NOT DEFINED | NOT DEFINED | $P_{42}$ |
| | ⋮ | ⋮ | ⋮ | ⋮ | ⋮ |
| | LAMBORGINIE | SPECIAL | NOT DEFINED | NOT DEFINED | $P_{4n}$ |

INSTALLATION KIT/INSTALLATION IMAGE DATA STORAGE

| | |
|---|---|
| $P_{11}$ → | INSTALLATION IMAGE DATA OF CMD-7857 CAMRY 2000 STANDARD |
| | INSTALLATION KIT CODE, CONNECTOR CODE, ETC. |
| $P_{12}$ | ⋮ |
| $P_{4n}$ → | INSTALLATION IMAGE DATA OF LAMBORGINIE SPECIAL |
| | INSTALLATION KIT CODE, CONNECTOR CODE, ETC. |
| | ⋮ |

FIG. 4

DEALER DATABASE

| NO. | DEALER NAME | ADDRESS | PHONE NO. | EVALUATION | | | DATES AND HOURS AVAILABLE FOR INSTALLATION |
|---|---|---|---|---|---|---|---|
| | | | | CHEAPNESS | SKILLFULNESS | QUICKNESS | |
| | | | | | | | |
| | | | | | | | |

FIG. 6

< Model List >

| Model | Price | Check |
|---|---|---|
| CDM-7857 | $ -- | ✓ |
| ⋮ | ⋮ | |
| DDS-R17K | $ -- | ✓ |
| ⋮ | ⋮ | |

Image

< Your Purchase Products >

| CDM-7857 | $ -- |
|---|---|
| DDS-R17K | $ -- |
| Total Price | $ -- |

OK | Return | ---

FIG. 8

< Car Information >

| Maker | Model Name | Year | Modification |
|---|---|---|---|
| Toyota ✓ | Camry ✓ | 2000 ✓ | Not done ✓ |
| Honda | Lexus | 1999 | Done |
| Ford | ⋮ | ⋮ | ⋮ |
| ⋮ | | | |

| Maker | Toyota |
|---|---|
| Model Name | Camry |
| Model Year | 2000 |
| Modification | None |

< Your Localtion & Name >

- City { ⋮ } → States { ⋮ } → Address: 1914, Gramercy Place, Torrance, CA
- States { ⋮ } → City { ⋮ }
- Zip Code { ⋮ }
- Name [ - - - - - ]
- Phone No. [ - - - - - ]

< Select Installation Grade >

| Installation Grade | | | |
|---|---|---|---|
| Standard 1 | 30 min. | $50 | ✓ |
| Standard 2 | 40 min. | $60 | |
| Up-Grade 1 | 70 min. | $100 | |
| Up-Grade 2 | 2.0 hours | $150 | |
| ⋮ | ⋮ | ⋮ | |
| Special | × | × | |

[Image] [OK]

FIG. 11

< Dealer's Condition & Installation Time >

| | |
|---|---|
| Installation | |
| Nearness | ✓ |
| Cheapness | ✓ |
| Skillfulness | |
| Quickness | |
| Other Preference | |

Month | Date
June | 30

Time
| 9:00 ~ 13:00 | |
| 13:00 ~ 17:00 | |
| 17:00 ~ 20:00 | ✓ |

| No. | Dealer Name | Installation Time | Address Driving time | Phone | |
|---|---|---|---|---|---|
| | | < Dealer List > | Your Choice —<br>Standard 1 $50.0<br>June 30, 17:00~20:00 | | |
| 1 | Good Guys | June 30<br>17:00~17:30 | San Pedro<br>5 min. | --- | ✓ |
| 2 | Circuit City | June 30<br>17:30~18:30 | Torrance<br>20 min. | --- | |
| 3 | Circuit City | June 30<br>19:30~20:00 | Torrance<br>20 min. | --- | |
| ⋮ | ⋮ | ⋮ | ⋮ | ⋮ | ⋮ |

< Dealer >

| Dealer Name | Installation Time | Address Driving time | Phone |
|---|---|---|---|
| Good Guys | June 30,<br>17:00~17:30 | San Pedro<br>5 min. | △△--△ |

< Total Cost >

< Payment >

Credit Card
   Visa
   Master Card
   Amex

No.
| | | | | --- | |

Sorry, we do not accept other payment.

OK

ELECTRONIC SHOPPING SYSTEM

BACKGROUND OF THE INVENTION

1. Field of the Invention

The present invention relates to an electronic shopping system for selling a vehicle device desired by a consumer by means of communication with a consumer terminal device via a network, and more particularly to an electronic shopping system having the capability of determining a dealer who is to install a sold vehicle device on a vehicle of the consumer who purchased the vehicle device and also having the capability of determining the date/time when the vehicle device is to be installed.

2. Description of the Related Art

In recent years, Internet communication means such as an Internet television has become very popular, and is used for sales in a wide variety of forms which are not limited by physical distribution. For example, in an electronic shopping system on the Internet, a consumer accesses a web site of a dealer and purchases a desired product. After that, payment is performed in a predetermined manner, and the product is sent from the dealer. Thus, the sales procedure is completed.

Some products are required to be installed by skilled persons. For example, vehicle devices such as a car audio device and a navigation unit practically cannot be installed on a vehicle by a consumer, and such devices are generally installed by dealers. In Internet electronic shopping systems which sell vehicle devices, if the system has the capability of determining the dealer who is to perform installation and the date/time of the installation, the user is required only to visit the dealer by his/her car on the installation date/time. The user can wait for a short period of time until the installation is completed, and the user can drive his/her car immediately after the completion of the installation. Thus, a great improvement in service to consumers can be achieved.

Furthermore, if the electronic shopping system has the capability of determining installation kits, cables, connectors, and the like required in installation depending upon installation grades, it becomes possible to deliver the required installation kits and vehicle devices to dealers by the installation date/time, and it becomes unnecessary for the dealers to make additional arrangements to obtain the installation kits. In this case, what is required for the dealers is simply to perform installation.

SUMMARY OF INVENTION

It is an object of the present invention to provide an electronic shopping system capable of determining an installation dealer and an installation date/time.

It is another object of the present invention to provide an electronic shopping system capable of automatically determining an installation kit, a cable, a connector, and the like required in installation depending upon an installation grade desired by a consumer.

It is still another object of the present invention to provide an electronic shopping system capable of automatically determining a dealer who best fits conditions specified by a consumer.

The present invention provides a first electronic shopping system for selling vehicle devices, comprising: (1) first storage means for storing installation kit information indicating an installation kit required to install a vehicle device, for each combination of the vehicle device and a vehicle type; (2) second storage means for storing information about a plurality of dealers who are to install sold vehicle devices on vehicles; and (3) processing means for determining an installation dealer and an installation date/time on the basis of the location of a consumer, candidates for the installation dates/times given by the consumer, and the dealer information, and transmitting the information about the determined installation dealer and installation date/time to the consumer terminal device; acquiring, from the first storage means, installation kit information indicating an installation kit required to install the sold vehicle device on a vehicle of the consumer; and making arrangements for delivering the vehicle device and the installation kit to the installation dealer.

In the first electronic shopping system, preferably, the processing means notifies the installation dealer of the installation date/time, the name of the consumer, the vehicle device information, and the vehicle information, and the processing means also sends a command to a warehouse/delivery center to deliver the sold vehicle device and the installation kit. Alternatively, the processing means may request a kit dealer to deliver the installation kit to the installation dealer.

Furthermore, in the first electronic shopping system, the first storage means may store installation kit information indicating an installation kit required to install a vehicle device, for each combination of a vehicle device, a vehicle type, and an installation grade, and the processing means may determine, from the first storage means, the installation kit corresponding to the vehicle of the consumer, the installation grade specified by the consumer, and the vehicle device sold to the consumer.

Furthermore, in the first electronic shopping system, the second storage means may store dealer information including a dealer name, a dealer address, and an available installation date/time, for each dealer, and the processing means may select a plurality of candidates for installation dealers who are available on the installation date/time specified by the user and whose location is close to the location of the consumer, and then display, on the consumer terminal, the information about the candidates for the installation dealers, and finally determine the dealer specified by the consumer as the installation dealer.

Furthermore, in the first electronic shopping system, the second storage means may store dealer information including a dealer name, a dealer address, an available installation date/time, and dealer evaluation data, for each dealer, and the processing means may select, on the basis of the dealer information, a dealer who meets the requirement about the installation date/time requested by the consumer and who best fits the dealer conditions specified by the consumer and may determine the selected dealer as the installation dealer.

Furthermore, in the first electronic shopping system, the second storage means may store newest information about dates/times available for installation received from a terminal device of each dealer in such a manner that the information is stored for each dealer.

The present invention also provides a second electronic shopping system for selling vehicle devices, comprising: (1) first storage means for storing installation kit information indicating an installation kit required to install a vehicle device, for each combination of the vehicle device and a vehicle type; (2) second storage means for storing information about a plurality of dealers who are to install sold vehicle devices on vehicles; (3) processing means for determining a plurality of candidates for installation dealers whose location is close to the location of the consumer on the basis of the information about the location of the consumer and said dealer information, and then displaying the resultant candidates for installation dealers on the consumer terminal device; determining, as the installation dealer, a dealer specified by the consumer; communicating with the determined dealer to determine a date/time when the vehicle device is to be installed; acquiring, from the first storage means, installation kit information indicating an installation kit required to install the sold vehicle device on a vehicle of the consumer; and making arrangements for delivering the vehicle device and the installation kit to the installation dealer.

The present invention also provides a third electronic shopping system for selling vehicle devices, comprising: (1) first storage means for storing installation kit information indicating an installation kit required to install a vehicle device, for each combination of the vehicle device and a vehicle type; (2) second storage means for storing information about a plurality of dealers who are to install sold vehicle devices on vehicles; and (3) processing means for acquiring, from the first storage means, installation kit information indicating an installation kit required to install the sold vehicle device on a vehicle of the consumer, and then ordering the installation kit from a kit dealer; and determining an installation dealer and an installation date/ time on the basis of the location of the consumer, the date/time desired by the consumer, and the dealer information, and then sending a message indicating the determined installation dealer and installation date/time to the consumer terminal device.

In the first to third electronic shopping systems for selling vehicle devices, according to the present invention, it is possible not only to sell vehicle devices but also to determine installation dealers and installation dates/times. Furthermore, it is possible to determine which installation kits and cables are required for installation corresponding to installation grades specified by consumers, and it is possible to select installation dealers who best fit the requirements specified by consumers.

Other features and advantages of the present invention will be apparent from the following description taken in conjunction with the accompanying drawings.

BRIEF DESCRIPTION OF THE DRAWINGS

FIG. 2 is a schematic diagram illustrating a product database;

FIG. 3 is a schematic diagram illustrating an installation database;

FIG. 4 is a schematic diagram illustrating a dealer database;

FIG. 6 illustrates an example of a displayed model list;

FIG. 7 illustrates an example of a displayed list of purchased products;

FIG. 8 illustrates an example of a screen for inputting vehicle information;

FIG. 9 illustrates an example of a screen for inputting the location and the name of a consumer;

FIG. 10 illustrates an example of a screen for specifying an installation grade;

FIG. 11 illustrates an example of a screen for specifying dealer conditions and an installation date/time;

FIG. 12 illustrates an example of a displayed list of candidates for dealers;

FIG. 13 illustrates an example of a screen which displays a dealer and a total cost;

FIG. 14 illustrates an example of a screen for inputting payment card information.

DESCRIPTION OF THE PREFERRED EMBODIMENTS (A) Electronic Shopping System

Figure 1:
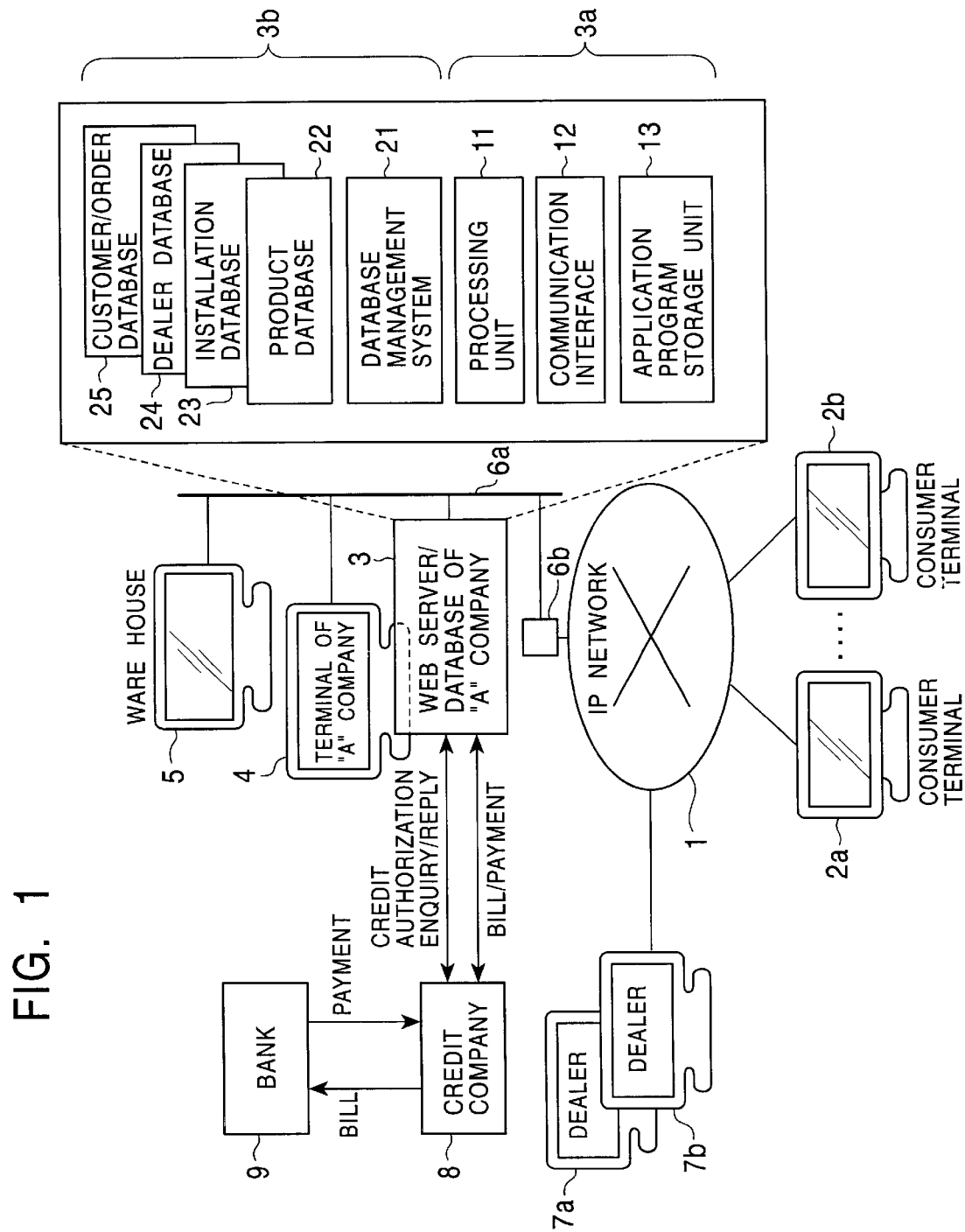
FIG. 1 is a schematic diagram illustrating an electronic shopping system according to the present invention.

FIG. 1 is a schematic diagram illustrating an electronic shopping system according to the present invention. The electronic shopping system includes a communication network 1 such as an IP network (Internet), consumer terminal devices 2a, 2b, . . . , a web server/database 3 of A company including a web server 3a and a database 3b forming a web site which sells various vehicle devices of A company, a personal computer terminal 4 of A company, and a personal computer terminal 5 installed in a warehouse/delivery division. The web server 3a and the personal computer terminals 4 and 5 are connected to each other via a LAN (Local Area Network) 6a which is further connected to the Internet 1 via a switching hub or a router 6b. The personal computer terminal of A company acquires, from the web server/ database 3, information about orders received via the electronic shopping. In accordance with the information about the order, the personal computer terminal of A company sends a command to the personal computer terminal 5 disposed in the warehouse/delivery center to make an arrangement associated with products, installation kits, cables, etc.

Terminal devices 7a, 7b, . . . disposed in installation dealers which are under contract with A company notify at scheduled times the personal computer terminal 4 of A company of the time periods, which are available for installation, of each day within a predetermined span. The personal computer terminal 4 of A company sends installation reservation information (indicating installation dates/ times, consumer names, vehicle device names, types/models of vehicles on which the vehicle devices are to be installed, installation grades) to the terminal devices 7a, 7b, . . . of the respective installation dealers. The newest information about the time periods available for installation received from the respective dealers is stored, by the personal computer terminal 4 of A company, in the database 3b of the web server/database 3. A credit company 8 communicates with the web server 3a to perform credit authorization enquiry/ reply, send bills, and perform payment. A bank 9 performs payment in response to bills received from the credit company 8.

The web server 3a includes a processing unit 11, a communication interface 12, and a storage unit 13 for storing various kinds of application software used to realize the electronic shopping capability. The application software includes a CGI (Common Gateway Interface) used by the web server 3a to access the database 3b and describe data therein. The database 3b includes a database management system 21, a product database 22, an installation database 23, a dealer database 24, and a customer/order database 25.

As shown in FIG. 2, the product database 22 stores information indicating the product category, the product ID (model ID), the price, and the pointer which points to a storage location where the product image and product performance data are stored, for all products of A company, wherein these parameters are linked to each other. In accordance with the information described in the product database 22, the processing unit 11 sends a product list to the consumer terminal devices 2a, 2b, . . . , and also sends the appearance image and the performance/feature data of a product specified by a consumer.

As shown in FIG. 3, the installation database 23 stores information representing a standard installation time, an installation cost including the cost of an installation kit, and a pointer which points to a storage location where the installation image and the information about the installation kit are stored, for each combination of a product, a vehicle type/model, and an installation grade. Examples of the installation grades are standard-1, standard-2, upgrade-1, upgrade-2, and special grade (specified by a consumer). The final appearance becomes more beautiful with increasing installation grade. However, the installation time becomes longer and the installation cost becomes higher with the increase in the installation grade. In the case of the special grade specified by a consumer, the installation time and the installation cost are not pre-defined. When the product (vehicle device) to be purchased and the type/model of the vehicle of a consumer are determined, the processing unit 11 sends installation information representing the installation grade, the installation time, and the cost, together with the drawing of the installation appearance of the installation grade specified by the consumer, to the corresponding one of the consumer terminal devices 2a, 2b, . . .

As shown in FIG. 4, the dealer database 24 includes information representing the address, the phone number, the dealer evaluation data, and the dates and time periods available for installation, which are described in connection with the name of each dealer under contract with A company. Although it is not necessarily required that the dealer database 24 includes the dealer evaluation data, the dealer evaluation data represents the skill, the cheapness, and the quickness (no delay in delivery) which are evaluated for each dealer on the basis of questionnaires. The dates/times available for installation are updated on the basis of the newest information received at scheduled times via the terminal device of A company from the terminal devices 7a, 7b, . . . , of the respective dealers. The customer/order database 25 includes customer information and order information (shopping cart information).

(B) Installation Grades

In the USA, cars generally come with a pre-installed 2DIN audio device. If the 2DIN audio device is replaced with a 1DIN audio device, a 1DIN space is created. In the case where a 1.5DIN audio device is installed, a space is also created. Some audio devices project slightly forward when they are installed. Therefore, the appearance varies greatly depending upon the manner of installation. The created space may be closed with a ready-made cover kit of plastic or metal or with a hand-made plastic fiber cover for a special customization. The cost for such installation varies from $200 to $250/hour. When a high-quality appearance is desired, a high installation grade is selected although the cost is high. Conversely, when the appearance is not important, a low installation grade is selected to reduce the installation cost. The installation grades are generally classified into three grades: standard installation, upgrade installation, and special installation.

(1) Standard Installation

In the standard installation, a pre-installed vehicle device is removed, and a new product is installed. In the case where the existing vehicle device and a new device to be installed are the same in size, the installation is very simple. However, when there is a difference in size, it is necessary to eliminate a space. The installation cost in the standard installation can by estimated before the installation. In the standard installation grade, if the type/model of the car and the device to be installed are given, it is possible to determine the connector, the cable, and the installation kit (a plastic frame for closing a space which is created when an audio device is installed on a dashboard, or an adapter used to install a speaker) on the basis of the information described in the installation database 23.

(2) Upgrade Installation

In the upgrade installation, a metal frame is employed as the installation kit instead of a plastic frame. The upgrade installation includes installation of an additional new product (DVD player, monitor, VCR, rear entertainment system, overhead monitor, speaker, amplifier). In the upgrade installation, as in the standard installation, the installation cost can be estimated before the installation. If the type/model of the car and the device to be installed are given, it is also possible to determine the connector, the cable, and the installation kit on the basis of the information described in the installation database 23.

(3) Special Installation

In the special installation, special installation work is necessary. Some examples are: (1) embedding a speaker or an amplifier in a rear seat; (2) embedding a CD changer on a dashboard; and (3) embedding an amplifier in a trunk. In the highest installation grade, a dashboard is made by hand using fiber glass.

(C) Electronic Shopping Process

Figure 5:
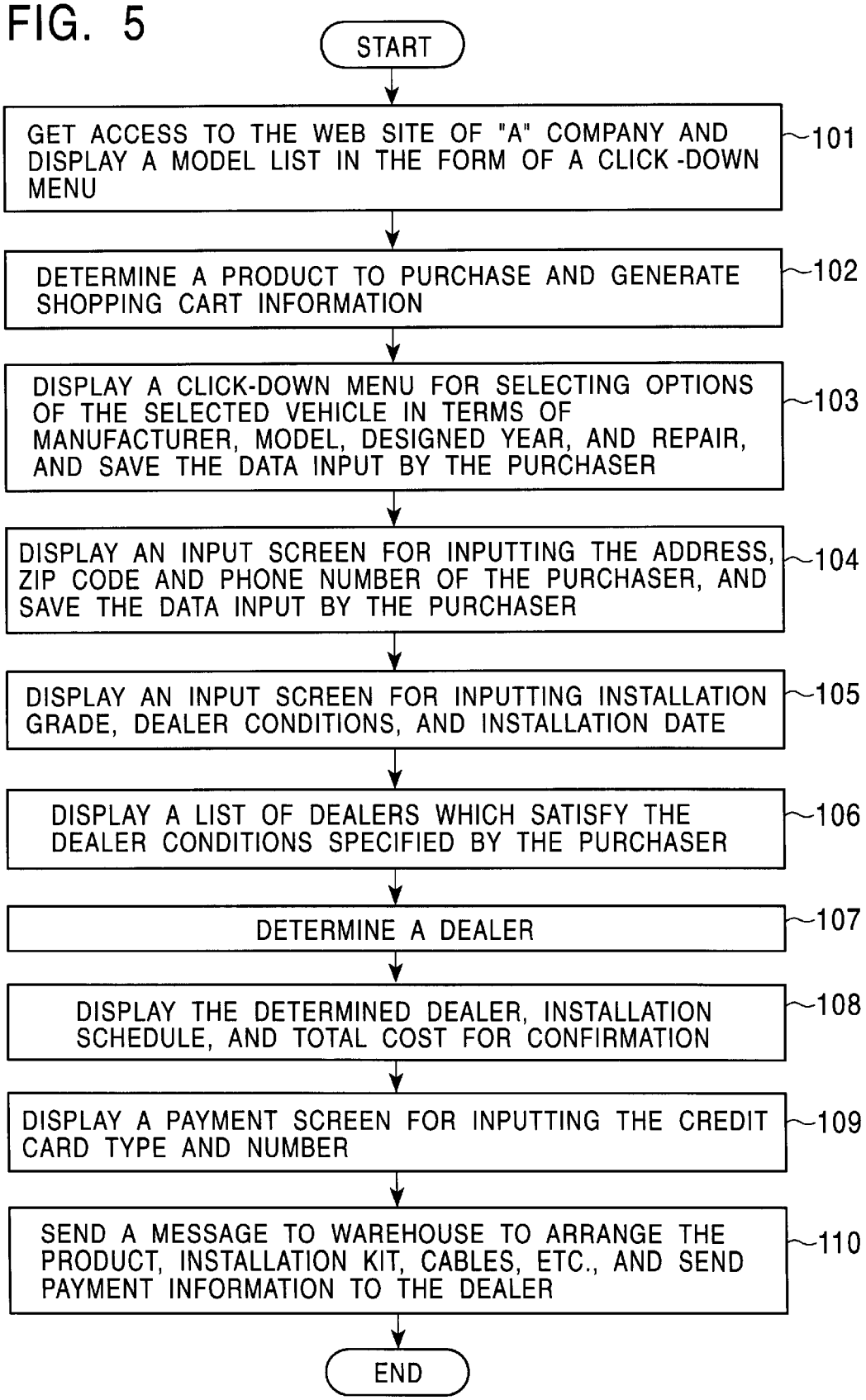
FIG. 5 is a flow chart illustrating the process performed in the electronic shopping system according to the present invention.

FIG. 5 is a flow chart illustrating the process performed in the electronic shopping system according to the present invention.

When a consumer wants to purchase a vehicle device from A company, the consumer accesses the web server 3a of A company and performs necessary operations. In response, the web server 3a sends a model list to the terminal device of the consumer so that the model list in the form of a click-down menu (FIG. 6) is displayed on the screen of the consumer terminal device (step 101). The consumer selects a product from the click-down menu and checks the appearance and the performance of the selected product by operating an image key. If a desired product is found, the consumer makes a tentative purchase determination. After the completion of the tentative determination of the product to purchase, if an OK key is pressed, the list of purchased products and prices is displayed (FIG. 7). If an OK key is further pressed, the purchased products are finally determined.

After the determination of the product (vehicle device) to purchase, the web server 3a generates shopping cart information including purchased product information (step 102). Subsequently, the web server 3a displays, on the screen of the consumer terminal device, a click-down menu used to specify the manufacturer name, the model name, the designed year, and the repair history of the vehicle of the consumer (FIG. 8). In this process, the consumer selects data from the click-down menu for each item. In the case where no desirable data is found in the menu, the consumer can input data via a keyboard. If an OK key is pressed after the completion of inputting all vehicle data, the web server 3a incorporates the input vehicle data into the shopping cart information and stores it (step 103).

After the completion of inputting the vehicle data, the web server 3a displays, on the screen of the consumer terminal device, a click-down menu used to input the location and the name of the consumer (FIG. 9). After inputting the address, the name, and the phone number of the consumer, if the consumer presses an OK key, the web server 3a incorporates the input data representing the location and the name of the consumer into the shopping cart information and stores it (step 104).

Subsequently, the web server 3a accesses the installation database 23 (FIG. 3) to extract a plurality of installation grades available for installation of the selected vehicle device on the vehicle of the consumer. The web server 3a displays, on the screen of the consumer terminal device, a click-down menu indicating the available grades (FIG. 10). Here, the installation time and the installation cost required for each grade are also displayed. The consumer checks the appearance for each grade in the click-down menu, by operating an image key. If the consumer presses an OK key after determining the installation grade, the web server 3a incorporates the data representing the installation grade in the shopping cart information and stores it.

After that, the web server 3a displays, on the screen of the consumer terminal device, an image used to input dealer conditions (distance from the location of the consumer, cheapness, skill) and a desired installation date/time (FIG. 11, step 105). If the consumer specifies the dealer conditions and inputs the desired installation date/time, the web server 3a searches the dealer database 24 to extract a plurality of dealers who match well the conditions specified by the consumer. The web server 3a then displays, on the screen of the consumer terminal device, the dealer list in the form of a click-down menu in which the extracted dealers are listed in the decreasing order of the matching degree (FIG. 12, step 106). The dealer list includes the dealer name, the available installation dates/times, the dealer address, the time required for the consumer to drive to the dealer, and the phone number for each dealer. The consumer selects a dealer from the click-down menu and determines the selected dealer as the installation dealer (step 107). Alternatively, the dealer which best fits the conditions specified by the consumer may be automatically determined.

When the installation dealer is determined, the web server 3a incorporates the dealer information and the data representing the installation date/time into the shopping cart information and stores it. The web server 3a then sends the dealer information and the data representing the installation date/time and the total cost to the consumer terminal device so as to display them thereon (FIG. 13). If the consumer agrees with them, the consumer presses an OK key so as to inform the web server of the agreement (step 108).

When the web server 3a receives the agreement message from the consumer, the web server 3a concludes that the sales agreement has been completely achieved, and the web server 3a sends image information for specifying the payment manner so as to display it on the consumer terminal device (FIG. 14). The consumer inputs the credit card type and the credit card number and sends them to the web server (step 109).

Upon reception of the credit card information from the consumer terminal device, the web server 3a requests the credit company 6 to check the credit authorization. If the reply from the credit company 6 is positive, the web server 3a performs a billing/payment process. Furthermore, the web sever 3a accesses the installation database 23 to acquire information about the vehicle device sold, the type/model of the vehicle of the consumer, and the installation kit, connector, and cable corresponding to the installation grade.

The web server 3a incorporates the acquired information together with the credit card information into the shopping cart information and stores it in the customer/order database 25.

If the terminal device 4 of A company acquires the shopping cart information from the web server/database 3, the terminal device 4 sends an order/delivery message to the terminal device 5 in the warehouse/delivery center to request it to make an arrangement for delivery of the vehicle device and the installation kit to the dealer. Furthermore, the terminal device 4 of A company sends to the terminal device 7a of the installation dealer a message indicating the requested installation date/time, the installation grade, the name of the consumer, and the vehicle device information (step 110). The terminal device 4 of A company pays the installation cost to the dealer on a predetermined date. The installation cost, which is one of common wages, is determined under the agreement with the dealer. Thus, the electronic shopping procedure associated with the vehicle device which is to be installed is completed.

(D) Modifications

In the embodiment described above, the dealer information includes the dealer name, the dealer address, the available installation dates/times, and the evaluated rank of each dealer, and a dealer is selected who meets the requirement about the installation date/time requested by a consumer and who best fits the dealer conditions specified by the consumer. However, the evaluated rank of the dealer is not necessarily required to be included in the dealer information, and a plurality of candidates for installation dealers who meet the requirement about the installation date/time requested by a consumer and whose location is close to the location of the consumer may be presented so that the consumer may select an installation dealer from the candidates.

In the embodiment described above, the newest information about the available installation dates/times received from the respective dealers is reflected in the dealer database. Instead, such information may not be reflected in the dealer database. In this case, a list of candidates for dealers sorted in the order of the degree to which the criterion specified by a consumer is satisfied, for example, in increasing order of the distance to the location of the consumer, is presented to the consumer. The number of candidates is reduced step by step in accordance with a requirement specified by the consumer until one dealer is finally selected. Preferably, A company has an agreement with the respective dealers such that each dealer has a person who is exclusively responsible for installation in response to web based installation requests. In the case where the installation is rather simple as in the standard or upgrade installation, after the installation dealer is selected, a reservation for the installation date/time is made by means of direct on-line communication with the person who is exclusively responsible for installation in response to web based installation requests. In the case where complicated installation is required, a guideline about the installation time (for example, one week after a certain date) is automatically sent to the consumer. The consumer selects the manner of receiving detailed information from the respective dealers via E-mail, telephone, or facsimile. When the detailed conditions have been determined via the above process and agreed to by the consumer, a confirmation process is performed and a reservation is established.

Figure 15:
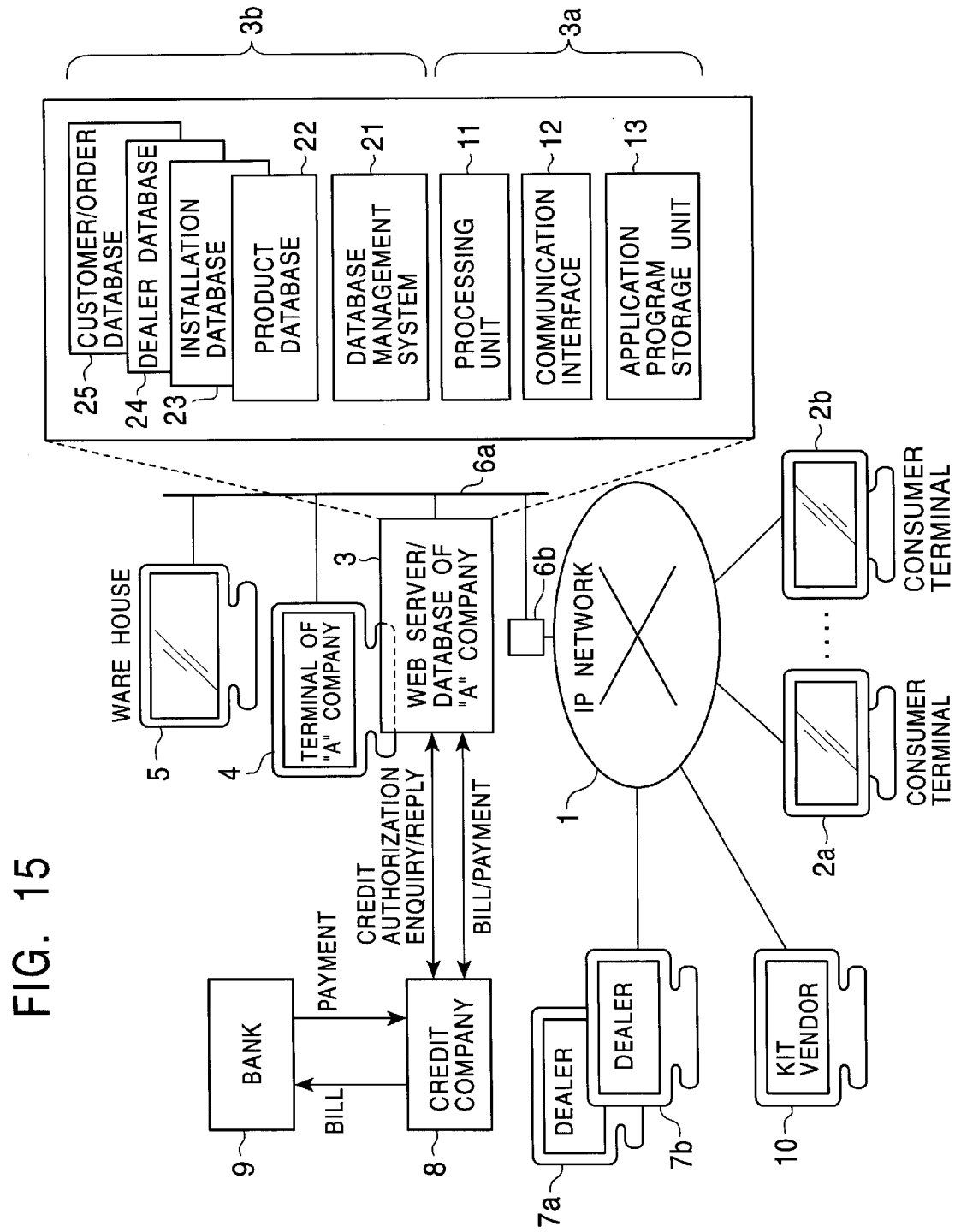
FIG. 15 is a schematic diagram illustrating another electronic shopping system according to the present invention.

In the specific example described above, the warehouse/delivery center of A company is requested to make an arrangement for delivery of both the sold vehicle device and the installation kit. Alternatively, it is may be possible to deliver the installation kit via a kit dealer under a contract. In this case, the electronic shopping system may be configured, for example, as shown in FIG. 15 in which similar elements to those in FIG. 1 are denoted by similar reference numerals. The electronic shopping system shown in FIG. 15 is different from that shown in FIG. 1 in that a personal computer terminal 10 of a kit dealer is connected to the network 1.

In the USA, there are kit dealers who sell standard installation kits, cables, and connectors required to install audio products, after-market products sold by audio device manufacturers, on various types of vehicles. Standard installation kits are available from such kit dealers at lower prices within a shorter delivery time than from manufacturers. Therefore, many installation dealers purchase standard installation kits from kit dealers instead of purchasing them from audio device manufacturers. In such a situation, many audio device manufacturers do not sell installation kits and recommend that users employ particular installation kits available from kit dealers. The electronic shopping system shown in FIG. 15 is constructed so that the above-described situation is reflected therein. That is, A company has a stock of products thereof but does not have a stock of installation kits. A company has agreements with kit dealers such that A company sends orders to kit dealers, and, in response to the orders, the kit dealers send the installation kits to installation dealers specified by the A company.

More specifically, in step 105 in FIG. 5, when the consumer determines the installation grade, the web server 3a accesses the installation database 23 to determine the installation kit, the connector, and the cable. Subsequently, the web server 3a accesses the personal computer terminal 10 of the kit dealer to acquire the information about the dates/times available for delivery of the installation kit to installation dealers. The web server 3a also accesses the personal computer terminal 5 of the warehouse/delivery center of A company to acquire the information about the dates/times available for delivery of the sold product to the installation dealer. After that, the web server 3a selects a date/time which is within the dates/times available for delivery of the product and within the dates/times available for delivery of the installation kit and which is included in the candidates of installation dates/times specified by the consumer, and determines the selected date/time as the installation date/time. The web server 3a retrieves installation dealers who are available on the determined installation date/time, and extracts, from the retrieved installation dealers, a plurality of installation dealers whose location is close to the location of the consumer. The web server 3a displays the list of candidates for installation dealers in the form of a click-down menu on the terminal device of the consumer. The consumer selects a dealer from the list and determines it as the installation dealer (step 106, 107).

Subsequently, billing and payment are performed in steps 108, 109, and 110 as shown in FIG. 5. After that, the terminal device 4 of A company sends a command to the terminal device 5 of the warehouse/delivery center to make an arrangement for the delivery of the sold vehicle device to the installation dealer. The terminal device 4 of A company orders the installation kit from the kit dealer and requests the kit dealer to deliver the installation kit to the specified installation dealer. Furthermore, the terminal device 4 of A company notifies the terminal device 7a of the installation dealer of the installation date/time, the installation grade, the consumer name, and the vehicle device information.

In the electronic shopping system for selling vehicle devices according to the present invention, as described above, it is possible not only to sell products but also to determine installation dealers and installation dates/times, and thus an improvement in service to consumers is achieved.

Furthermore, in the electronic shopping system for selling vehicle devices according to the present invention, it is possible to determine which installation kits and cables are required for installation corresponding to installation grades specified by consumers, and it is possible to deliver the vehicle devices, the installation kits, and the cables to installation dealers before installation.

Furthermore, in the electronic shopping system for selling vehicle devices according to the present invention, it is possible to select an installation dealer who best matches the requirements (about distance, cost, skill, installation time) specified by a consumer.

As many widely different embodiments of the present invention can be made without departing from the spirit and scope thereof, it is to be understood that the invention is not limited to the specific embodiments thereof except as defined in the appended claims.

What is claimed is:

1. An electronic shopping system for selling a vehicle device desired by a consumer by means of communication with a consumer terminal device via a network, said electronic shopping system comprising:

first storage means for storing installation kit information indicating an installation kit required to install a vehicle device, for each combination of the vehicle device and a vehicle type;

second storage means for storing information about a plurality of dealers who are to install sold vehicle devices on vehicles; and processing means for determining an installation dealer and an installation date/time on the basis of the location of a consumer, desired installation dates/times given by the consumer, and said dealer information, and transmitting the information about the determined installation dealer and installation date/time to the consumer terminal device;

acquiring, from said first storage means, installation kit information indicating an installation kit required to install the sold vehicle device on a vehicle of the consumer; and making arrangements for delivering the vehicle device and the installation kit to the installation dealer.

2. An electronic shopping system according to claim 1, wherein said processing means notifies the installation dealer of the installation date/time, the name of the consumer, the vehicle device information, and the vehicle information, and said processing means also sends a command to a delivery center to deliver the sold vehicle device and the installation kit.

3. An electronic shopping system according to claim 1, wherein said first storage means stores installation kit information indicating an installation kit required to install a vehicle device, for each combination of a vehicle device, a vehicle type, and an installation grade; and said processing means determines, from said first storage means, the installation kit corresponding to the vehicle of the consumer, an installation grade specified by the consumer, and the vehicle device sold to the consumer.

4. An electronic shopping system according to claim 1, wherein said second storage means stores dealer information including a dealer name, a dealer address, and at least one available installation date/time, for each dealer; and said processing means selects a plurality of candidates for installation dealers who are available on the installation date/time specified by the user and whose location is close to the location of the consumer, and then displays, on the consumer terminal, the information about the candidates for the installation dealers, and finally determines the dealer specified by the consumer as the installation dealer.

5. An electronic shopping system according to claim 1, wherein said second storage means stores dealer information including a dealer name, a dealer address, at least one available installation date/time, and dealer evaluation data, for each dealer; and said processing means selects, on the basis of the dealer information, a dealer who meets the requirement of the installation date/time requested by the consumer and who best fits the dealer conditions specified by the consumer and determines the selected dealer as the installation dealer.

6. An electronic shopping system according to claim 2, wherein said second storage means stores new information about dates/times available for installation received from a terminal device of each dealer in such a manner that said information is stored for each dealer.

7. An electronic shopping system for selling a vehicle device desired by a consumer by means of communication with a consumer terminal device via a network, said electronic shopping system comprising:

first storage means for storing installation kit information indicating an installation kit required to install a vehicle device, for each combination of the vehicle device and a vehicle type;

second storage means for storing information about a plurality of dealers who are to install sold vehicle devices on vehicles; and processing means for determining a plurality of candidates for installation dealers whose location is close to the location of the consumer on the basis of the information about the location of the consumer and said dealer information, and then displaying the resultant candidates for installation dealers on the consumer terminal device;

determining, as the installation dealer, a dealer specified by the consumer;

communicating with the determined dealer to determine a date/time when the vehicle device is to be installed;

acquiring, from said first storage means, installation kit information indicating an installation kit required to install the sold vehicle device on a vehicle of the consumer, and making arrangements for delivering the vehicle device and the installation kit to the installation dealer.

8. An electronic shopping system for selling a vehicle device desired by a consumer by means of communication with a consumer terminal device via a network, said electronic shopping system comprising:

first storage means for storing installation kit information indicating an installation kit required to install a vehicle device, for each combination of the vehicle device and a vehicle type;

second storage means for storing information about a plurality of dealers who are to install sold vehicle devices on vehicles; and processing means for acquiring, from said first storage means, installation kit information indicating an installation kit required to install the sold vehicle device on a vehicle of the consumer, and then ordering the installation kit from a kit dealer; and determining an installation dealer and an installation date/time on the basis of the location of the consumer, the date/time desired by the consumer, and said dealer information, and then sending a message indicating the determined installation dealer and installation date/time to the consumer terminal device.

9. An electronic shopping system according to claim 8, wherein information about dates/times when the sold vehicle device can be delivered and information about dates/times when the installation kit can be delivered are acquired from the delivery center and the kit dealer, respectively, and a date/time, which is within the dates/times when the sold vehicle device can be delivered and within the dates/times when the installation kit can be delivered and which is included in the possible installation dates/times specified by the consumer, is determined as the installation date/time.

10. An electronic shopping method for selling a vehicle device desired by a consumer by means of communication with a consumer terminal device via a network, said electronic shopping method comprising:

storing, in a first storage means, installation kit information indicating an installation kit required to install a vehicle device, for each combination of the vehicle device and a vehicle type;

storing, in a second storage means, information about a plurality of dealers who are to install sold vehicle devices on vehicles;

determining an installation dealer and an installation date/time on the basis of the location of a consumer, desired installation dates/times given by the consumer, and said dealer information, and transmitting the information about the determined installation dealer and installation date/time to the consumer terminal device;

acquiring, from said first storage means, installation kit information indicating an installation kit required to install the sold vehicle device on a vehicle of the consumer; and making arrangements for delivering the vehicle device and the installation kit to the installation dealer.

11. An electronic shopping method according to claim 10, further comprising: notifying the installation dealer of the installation date/time, the name of the consumer, the vehicle device information, and the vehicle information, and sending a command to a delivery center to deliver the sold vehicle device and the installation kit.

12. An electronic shopping method according to claim 10, wherein the stored installation kit information indicates an installation kit required to install a vehicle device, for each combination of a vehicle device, a vehicle type, and an installation grade; and the act of acquiring includes determining the installation kit corresponding to the vehicle of the consumer, an installation grade specified by the consumer, and the vehicle device sold to the consumer.

13. An electronic shopping method according to claim 10, wherein the stored dealer information includes a dealer name, a dealer address, and at least one available installation date/time, for each dealer;

the act of determining includes selecting a plurality of candidates for installation dealers who are available on the installation date/time specified by the user and whose location is close to the location of the consumer, and displaying, on the consumer terminal, the information about the candidates for the installation dealers; and finally determining the dealer specified by the consumer as the installation dealer.

14. An electronic shopping method according to claim 10, wherein the stored dealer information includes a dealer name, a dealer address, at least one available installation date/time, and dealer evaluation data, for each dealer; and the act of determining includes selecting, on the basis of the dealer information, a dealer who meets the requirement of the installation date/time requested by the consumer, and who best fits the dealer conditions specified by the consumer, and determining the selected dealer as the installation dealer.

15. An electronic shopping method according to claim 11, wherein the stored dealer information includes new information about dates/times available for installation received from a terminal device of each dealer in such a manner that said information is stored for each dealer.

16. An electronic shopping method for selling a vehicle device desired by a consumer by means of communication with a consumer terminal device via a network, said electronic shopping method comprising:

storing, in a first storage means, installation kit information indicating an installation kit required to install a vehicle device, for each combination of the vehicle device and a vehicle type;

storing, in a second storage means, information about a plurality of dealers who are to install sold vehicle devices on vehicles;

determining a plurality of candidates for installation dealers whose location is close to the location of the consumer on the basis of the information about the location of the consumer and said dealer information, and then displaying the resultant candidates for installation dealers on the consumer terminal device;

determining, as the installation dealer, a dealer specified by the consumer;

communicating with the determined dealer to determine a date/time when the vehicle device is to be installed;

acquiring, from said first storage means, installation kit information indicating an installation kit required to install the sold vehicle device on a vehicle of the consumer, and making arrangements for delivering the vehicle device and the installation kit to the installation dealer.

17. An electronic shopping method for selling a vehicle device desired by a consumer by means of communication with a consumer terminal device via a network, said electronic shopping method comprising:

storing, in a first storage means, installation kit information indicating an installation kit required to install a vehicle device, for each combination of the vehicle device and a vehicle type;

storing, in a second storage means, information about a plurality of dealers who are to install sold vehicle devices on vehicles;

acquiring, from said first storage means, installation kit information indicating an installation kit required to install the sold vehicle device on a vehicle of the consumer, and then ordering the installation kit from a kit dealer; and determining an installation dealer and an installation date/time on the basis of the location of the consumer, the date/time desired by the consumer, and said dealer information, and then sending a message indicating the determined installation dealer and installation date/time to the consumer terminal device.

18. An electronic shopping method according to claim 17, wherein information about dates/times when the sold vehicle device can be delivered and information about dates/times when the installation kit can be delivered are acquired from the delivery center and the kit dealer, respectively, and a date/time, which is within the dates/times when the sold vehicle device can be delivered and within the dates/times when the installation kit can be delivered and which is included in the possible installation dates/times specified by the consumer, is determined as the installation date/time.

19. A method of delivering, for installation, a vehicle device ordered by a consumer, comprising:

receiving consumer information including an identification of the consumer's location, the consumer's vehicle type, the vehicle device ordered for installation, and desired installation time(s);

identifying an installation dealer on the basis of the consumer's location, desired installation time(s), and the dealer's available installation time(s);

identifying an installation kit for installing the ordered vehicle device in the consumer's vehicle; and delivering the ordered vehicle device and the installation kit to the identified installation dealer.

20. A method according to claim 19, wherein a plurality of candiates for installation dealers are identified to the consumer, and the consumer selects an installation dealer.

21. A method according to claim 19, wherein the identifed installation kit is ordered from a kit dealer for delivery to the identified installation dealer.

* * * * *